(12) United States Patent
Marazano et al.

(10) Patent No.: US 10,759,024 B2
(45) Date of Patent: Sep. 1, 2020

(54) ABRASIVE ARTICLE INCLUDING SHAPED ABRASIVE PARTICLES

(71) Applicant: Saint-Gobain Ceramics & Plastics, Inc., Worcester, MA (US)

(72) Inventors: Alexandra Marazano, Saint Paul lès romans (FR); Paul Braun, Providence, RI (US); Yves Boussant-Roux, Avignon (FR); Cecile O. Mejean, Acton, MA (US); David F. Louapre, Paris (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 71 days.

(21) Appl. No.: 15/420,673

(22) Filed: Jan. 31, 2017

(65) Prior Publication Data

US 2018/0215975 A1    Aug. 2, 2018

(51) Int. Cl.
| | |
|---|---|
| *B32B 5/16* | (2006.01) |
| *B24D 99/00* | (2010.01) |
| *B24D 3/14* | (2006.01) |
| *C04B 35/111* | (2006.01) |
| *B01J 2/26* | (2006.01) |
| *C09K 3/14* | (2006.01) |

(52) U.S. Cl.
CPC ............... *B24D 99/00* (2013.01); *B01J 2/26* (2013.01); *B24D 3/14* (2013.01); *C04B 35/1115* (2013.01); *C09K 3/1427* (2013.01); *C04B 2235/3206* (2013.01); *C04B 2235/5427* (2013.01); *C04B 2235/606* (2013.01); *C04B 2235/6021* (2013.01); *C04B 2235/612* (2013.01); *C04B 2235/94* (2013.01)

(58) Field of Classification Search
CPC ................................ B24D 3/06; C09K 3/1409
USPC ......................................................... 428/402
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — Hoa (Holly) Le
(74) *Attorney, Agent, or Firm* — Abel Schillinger, LLP; Adrian Lawrence

(57) ABSTRACT

Various shaped abrasive particles are disclosed. Each shaped abrasive particle includes a body having at least one major surface and another surface extending from the major surface.

17 Claims, 9 Drawing Sheets

(56) References Cited

U.S. PATENT DOCUMENTS

| | | |
|---|---|---|
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |

(56) References Cited

U.S. PATENT DOCUMENTS

| | | |
|---|---|---|
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,690,707 A | 11/1997 | Wood et al. |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,871,555 A | 2/1999 | Wood |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A * | 11/1999 | Berg ............... B24D 3/06 264/6 |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |

(56) References Cited

U.S. PATENT DOCUMENTS

| | | |
|---|---|---|
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 9,017,439 B2 | 4/2015 | Yener et al. |
| D862,538 S | 10/2019 | Hanschen et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |

(56) References Cited

U.S. PATENT DOCUMENTS

| | | |
|---|---|---|
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1* | 1/2015 | Louapre .......... B24D 3/00 51/309 |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |
| 2018/0215976 A1 | 8/2018 | Cotter et al. |
| 2019/0270182 A1 | 9/2019 | Eckel et al. |
| 2019/0322915 A1 | 10/2019 | Jiwpanich et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |

(56) References Cited

FOREIGN PATENT DOCUMENTS

| | | |
|---|---|---|
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 9720011 A1 | 6/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A2 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A2 | 1/2018 |
| WO | 2018/026669 A1 | 2/2018 |
| WO | 2018/057465 A1 | 3/2018 |

(56) References Cited

FOREIGN PATENT DOCUMENTS

| WO | 2018/057558 A1 | 3/2018 |
|---|---|---|
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |
| WO | 2018/134732 A1 | 7/2018 |
| WO | 2018/136268 A1 | 7/2018 |
| WO | 2018/136269 A1 | 7/2018 |
| WO | 2018/136271 A1 | 7/2018 |
| WO | 2018207145 A1 | 11/2018 |
| WO | 2019167022 A1 | 9/2019 |
| WO | 2019197948 A1 | 10/2019 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
DuPont, "Kevlar Aramid Pulp", Copyright 2011, DuPont, 1 page.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.

\* cited by examiner

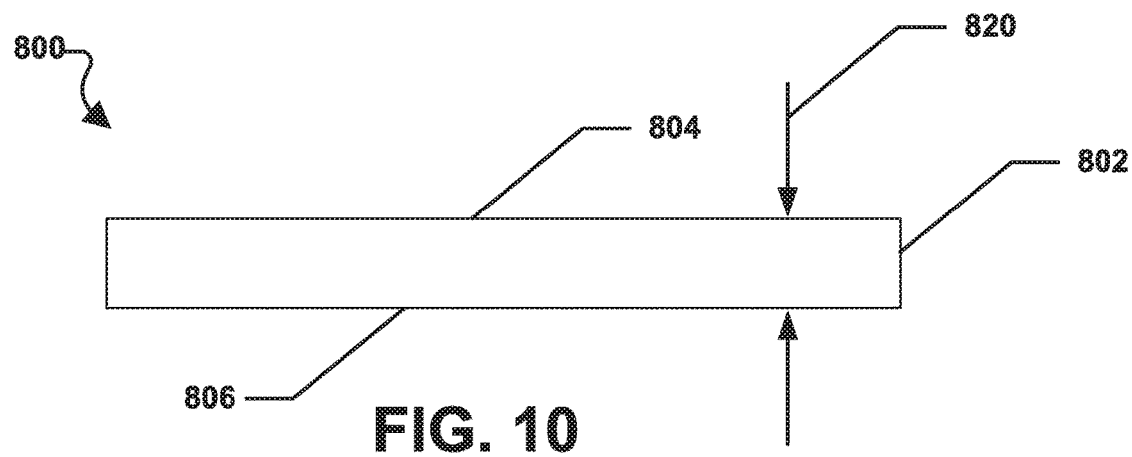
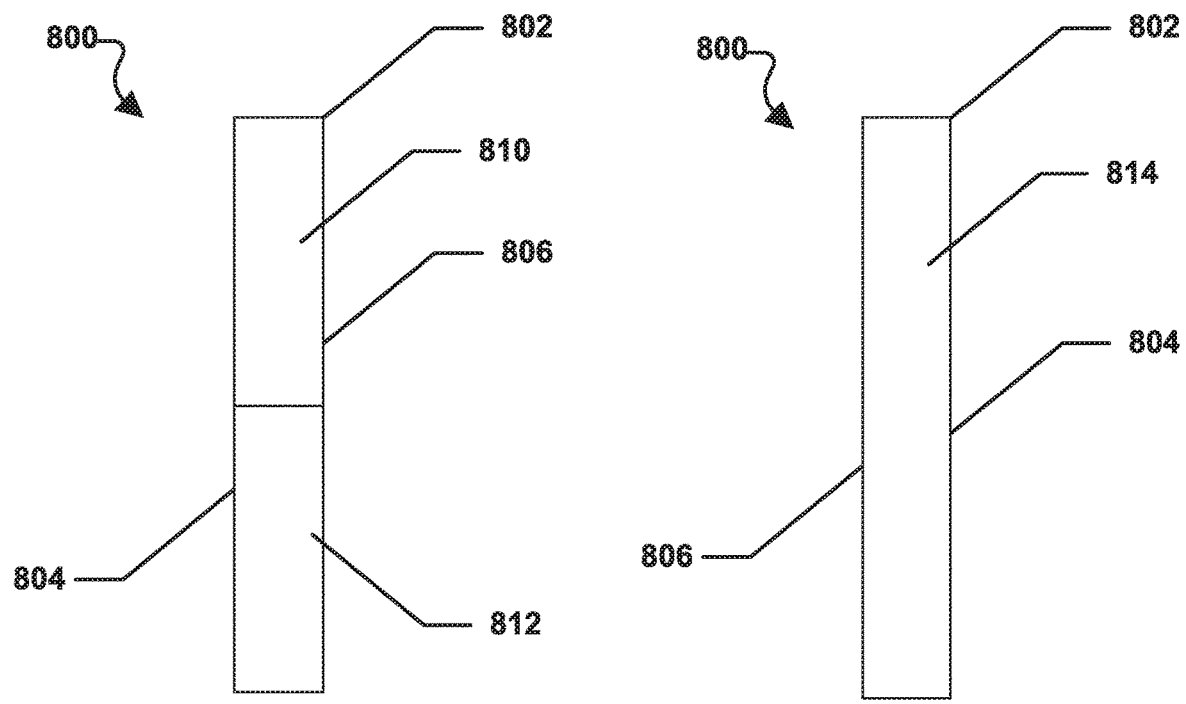

ABRASIVE ARTICLE INCLUDING SHAPED ABRASIVE PARTICLES

BACKGROUND

Field of the Disclosure

The following is directed to abrasive articles, and particularly, abrasive articles including shaped abrasive particles.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041. Other relevant disclosures on shaped abrasive particles and associated methods of forming and abrasive articles incorporating such particles are available at: http://www.abel-ip.com/publications/.

Still, there remains a need in the industry for improving performance, life, and efficacy of abrasive particles, and the abrasive articles that employ abrasive particles.

SUMMARY

According to a first aspect, a method for forming an abrasive particle includes forming a green particle having a body including at least one exterior corner having a first corner radius and contacting at least a portion of the body to a hydrophobic material and changing the first corner radius to a modified first corner radius.

In another aspect, a shaped abrasive particle includes a body including a first surface, a second surface, and a third surface extending between the first surface and the second surface, and wherein the body includes an exterior corner having a corner radius within a range of at least 0.5 microns and not greater than 15 microns.

In another aspect, a method for forming shaped abrasive particles includes creating a substrate including a sintered ceramic material, and cutting the substrate to form a plurality of shaped abrasive particles from the substrate.

In another aspect, a method of forming abrasive particles includes depositing a free-standing droplet on a substrate; the droplet comprising a mixture including a precursor ceramic material and sintering the free-standing droplet to form a shaped abrasive particle having an elliptical shape.

BRIEF DESCRIPTION OF THE DRAWINGS

The present disclosure may be better understood, and its numerous features and advantages made apparent to those skilled in the art by referencing the accompanying drawings.

FIG. 10 includes a front plan view of a shaped abrasive particle in accordance with an embodiment.

FIG. 11 includes a side plan view of a shaped abrasive particle in accordance with an embodiment.

FIG. 12 includes a side plan view of a shaped abrasive particle in accordance with an embodiment.

DETAILED DESCRIPTION

The following is directed to abrasive articles including shaped abrasive particles. The methods herein may be utilized in forming shaped abrasive particles and using abrasive articles incorporating shaped abrasive particles. The shaped abrasive particles may be utilized in various applications, including for example fixed abrasive articles such as, coated abrasives, bonded abrasives, non-woven abrasive materials and the like. Alternatively, the shaped abrasive particles may be used in free abrasives. Various other uses may be derived for the shaped abrasive particles.
System and Methods for Making Shaped Abrasive Particles Various systems and methods may be utilized to obtain shaped abrasive particles. Some suitable processes used to fabricate the shaped abrasive particles can include, but is not limited to, depositing, printing (e.g., screen-printing), molding, pressing, casting, sectioning, cutting, dicing, punching, drying, curing, coating, extruding, rolling, embossing, patterning, and a combination thereof.

Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the same group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

Figure 1:
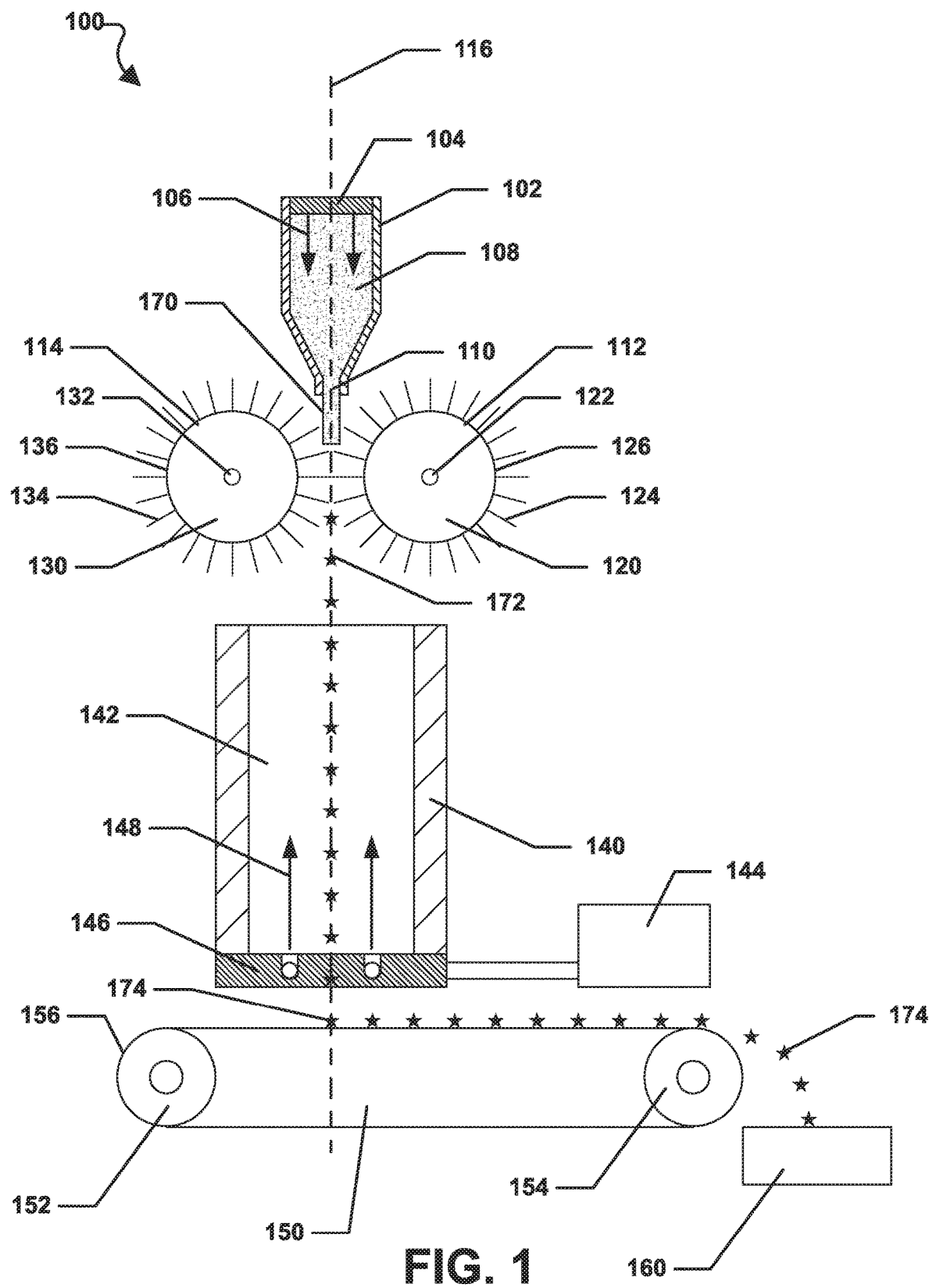
FIG. 1 includes a system for forming a particulate material in accordance with an embodiment.

FIG. 1 includes an illustration of a system 100 for forming a shaped abrasive particle in accordance with one, non-limiting embodiment. As shown, the system 100 may include an extruder 102 in which a piston 104 may move in order to apply a force 106 onto a mixture 108 within the extruder 102. The resulting pressure of the force 106 may extrude the mixture 108 through a die opening 110 in the extruder 102. As the mixture 108 is forced through the die opening 110, the mixture 108 can take on a cross-sectional shape of the die opening. For example, if the die opening 110 is round, the extruded mixture 108 can be round in cross-section. Further, if the die opening 110 is triangular, the extruded mixture 108 can be triangular in cross-section.

It can be appreciated that the die opening 110 can have nearly any regular, or irregular, polygonal shape. For example, the die opening 110 may be triangular with a square end, square with a semi-circular end, or square with a saw tooth end. In other embodiments, the die opening can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the die opening 110 may have a polygonal shape such as a rectangle, a quadrilateral, a pentagon, a hexagon, a heptagon, an octagon, a nonagon, a decagon, and a combination thereof.

As illustrated in FIG. 1, the system 100 can further include first rotating cutter 112 and a second rotating cutter 114. As shown, the pair of rotating cutters 112, 114 may be placed below, and on either side, of the extruder 102. Specifically, each of the rotating cutters 112, 114 can be spaced an equal distance from an extrusion axis 116 along which the mixture can be extruded. It will be appreciated that other operations and tools may be used to section the extrudate and form precursor shaped abrasive particles (i.e., green particles) and the following is representative of one particular process.

The first rotating cutter 112 can include a generally cylindrical body 120 mounted on an axle 122. During operation, the body 120 can rotate around the axle 122. The first rotating cutter 112 can also include a plurality of cutting blades 124 equally spaced around an outer periphery 126 of the body 120 of the first rotating cutter 112. As the body 120 of the first rotating cutter 112 rotates around the axle 122, the cutting blades 124 can also rotate.

Similarly, the second rotating cutter 114 can include a generally cylindrical body 130 mounted on an axle 132. During operation, the body 130 can rotate around the axle 132. The second rotating cutter 114 can also include a plurality of cutting blades 134 equally spaced around an outer periphery 136 of the body 130 of the second rotating cutter 114. As the body 130 of the second rotating cutter 114 rotates around the axle 132, the cutting blades 134 can also rotate.

As further shown in FIG. 1, the system 100 can include a dryer 140 located along the extrusion axis 116 below the rotating cutters 112, 114. Specifically, the dryer 140 can include an interior cavity 142 through which the extrusion axis 116 passes. The dryer 140 can include a fan 144 and the fan 144 can provide heated air to the interior cavity 142 via a manifold 146 place at or near the base of the dryer 140. The heated air can flow through the dryer 140 and can dry green particles as they fall through the dryer 140. In a particular aspect, heated air can flow upwards through the dryer 140 in the direction indicated by arrows 148. Alternatively or additionally, the dryer may use one or more radiant heat sources.

FIG. 1 also indicates that the system 100 can include a conveyor 150 that can be placed below the dryer 140. The conveyor 150 can include a drive wheel 152, a non-drive wheel 154, and a conveyor belt 156 placed there around. As the drive wheel 152 rotates, the drive wheel 152 can move the conveyor belt 156 on the drive wheel 152 and the non-drive wheel 154. The system 100 can also include a collection basket 160 placed near the downstream end of the conveyor 150.

The process of forming shaped abrasive particles using the system 100 can be initiated by forming the mixture 108. The mixture 108 can include a ceramic material and a liquid. In particular, the mixture 108 can be a gel formed of a ceramic powder material and a liquid. In accordance with an embodiment, the gel can be formed of the ceramic powder material as an integrated network of discrete particles.

The mixture 108 may contain a certain content of solid material, liquid material, and additives such that it has suitable rheological characteristics for use with the process detailed herein. That is, in certain instances, the mixture 108 can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object. It will be appreciated that in some instances, the mixture 108 may not be a shape-stable material, and the process may rely upon solidification and stabilization of the mixture 108 by further processing, such as drying.

The mixture 108 can be formed to have a particular content of solid material, such as the ceramic powder material. For example, in one embodiment, the mixture 108 can have a solids content of at least about 25 wt %, such as at least about 35 wt %, or even at least about 38 wt % or at least 40 wt % or at least 45 wt % or at least 50 wt % or at least 55 wt % for the total weight of the mixture 108. Still, in at least one non-limiting embodiment, the solids content of the mixture 108 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 108 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 108 can be formed to have a particular content of liquid material. Some suitable liquids may include water. In accordance with one embodiment, the mixture 108 can be formed to have a liquid content less than the solids content of the mixture 108. In more particular instances, the mixture 108 can have a liquid content of at least about 25 wt % for the total weight of the mixture 108. In other instances, the amount of liquid within the mixture 108 can be greater, such as at least about 35 wt %, at least about 45 wt %, at least about 50 wt %, or even at least about 58 wt %. Still, in at least one non-limiting embodiment, the liquid content of the mixture 108 can be not greater than about 75 wt %, such as not greater than about 70 wt %, not greater than about 65 wt %, not greater than about 62 wt %, or even not greater than about 60 wt %. It will be appreciated that the content of the liquid in the mixture 108 can be within a range between any of the minimum and maximum percentages noted above.

Furthermore, to facilitate processing and forming shaped abrasive particles according to embodiments herein, the mixture 108 can have a particular storage modulus. For example, the mixture 108 can have a storage modulus of at least about $1 \times 10^4$ Pa, such as at least about $4 \times 10^4$ Pa, or even at least about $5 \times 10^4$ Pa. However, in at least one non-limiting embodiment, the mixture 108 may have a storage modulus of not greater than about $1 \times 10^7$ Pa, such as not greater than about $2 \times 10^6$ Pa. It will be appreciated that the storage modulus of the mixture 108 can be within a range between any of the minimum and maximum values noted above.

The storage modulus can be measured via a parallel plate system using ARES or AR-G2 rotational rheometers, with Peltier plate temperature control systems. For testing, the mixture 108 can be extruded within a gap between two plates that are set to be approximately 8 mm apart from each other. After extruding the gel into the gap, the distance between the two plates defining the gap is reduced to 2 mm until the mixture 108 completely fills the gap between the plates. After wiping away excess mixture 108, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 108 can have a particular viscosity. For example, the mixture 108 can have a viscosity of at least about $2 \times 10^3$ Pa s, such as at least about $3 \times 10^3$ Pa s, at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In at least one non-limiting embodiment, the mixture 108 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 108 can be within a range between any of the minimum and maximum values noted above. The viscosity can be measured in the same manner as the storage modulus as described above.

Moreover, the mixture 108 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 108 that can be distinct from slurries used in conventional forming operations. For example, the content of organic materials within the mixture 108 and, in particular, any of the organic additives noted above, may be a minor amount as compared to other components within the mixture 108. In at least one embodiment, the mixture 108 can be formed to have not greater than about 30 wt % organic material for the total weight of the mixture 108. In other instances, the amount of organic materials may be less, such as not greater than about 15 wt %, not greater than about 10 wt %, or even not greater than about 5 wt %. Still, in at least one non-limiting embodiment, the amount of organic materials within the mixture 108 can be at least about 0.01 wt %, such as at least about 0.5 wt % for the total weight of the mixture 108. It will be appreciated that the amount of organic materials in the mixture 108 can be within a range between any of the minimum and maximum values noted above.

Moreover, the mixture 108 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 108 can have a pH of less than about 5, and more particularly, can have a pH within a range between about 2 and about 4.

As shown in FIG. 1, the extruder 102 can be configured so that as the piston 104 moves toward the die opening 110, the mixture 108 can be extruded through the die opening 110 along the extrusion axis 116. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 6 MPa. It will be appreciated that the pressure used to extrude the mixture 108 can be within a range between any of the minimum and maximum values noted above. In particular instances, the consistency of the pressure delivered by the piston 104 may facilitate improved processing and formation of shaped abrasive particles. Notably, controlled delivery of consistent pressure across the mixture 108 and across the width of the extruder 102 can facilitate improved processing control and improved dimensional characteristics of the shaped abrasive particles.

FIG. 1 shows that an extrudate 170 from the extruder 102 can move along the extrusion axis 116 and pass through the rotating cutters 112, 114. The blades 124, 134, on the rotating cutters 112, 114 can cut the extrudate 170 into green particles 172. In a particular aspect, a release agent may be applied to the blades 124, 134 on the rotating cutters 112, 114 to prevent the green particles 172 from sticking to the blades 124, 134 as they cut the extrudate 170. Such a process can be optional and may not necessarily be used prior to conducting the cutting process. A suitable exemplary mold release agent can include an organic material, such as one or more polymers (e.g., PTFE). In other instances, an oil (synthetic or organic) may be applied as a mold release agent to the surfaces of the blades 124, 134. One suitable oil may be peanut oil. The mold release agent may be applied using any suitable manner, including but not limited to, depositing, spraying, printing, brushing, coating, and the like.

After the extrudate 170 is cut into the green particles 172, the green particles 172 can fall through the dryer 140 where they can be dried and exit the dryer 140 as precursor shaped abrasive particles 174. Drying may include removal of a particular content of certain materials from the green particles 172, including volatiles, such as water or organic materials.

In accordance with an embodiment, the drying process can be conducted at a drying temperature of not greater than about 300° C., such as not greater than about 250° C., not greater than about 200° C., not greater than about 150° C., not greater than about 100° C., not greater than about 80° C., not greater than about 60° C., not greater than about 40° C., or even not greater than about 30° C. Still, in one non-limiting embodiment, the drying process may be conducted at a drying temperature of at least about −20° C., such as at least about −10° C. at least about 0° C. at least about 5° C. at least about 10° C., or even at least about 20° C. It will be appreciated that the drying temperature may be within a range between any of the minimum and maximum temperatures noted above.

In certain instances, drying may be conducted for a particular duration to facilitate the formation of shaped abrasive particles according to embodiments herein. It can be appreciated that increasing the length of the dryer, i.e., the distance through which the green particles 172 fall through the dryer 140, can increase the drying time 140. Further, increasing the speed of an updraft fan may also increase the drying time as the updraft may tend to blow the green particles 172 upwards into the dryer 140.

In a particular aspect, drying can be conducted for a duration sufficient to remove some volatile materials from the green particles and ensure proper formation of the shape abrasive particles. For example, the drying time can be at least 10 seconds or at least 60 seconds or at least 2 minutes or at least 5 minutes or at least 10 minutes or at least 20 minutes or at least 30 minutes or at least 60 minutes. In still other instances, the process of drying may be not greater than about 24 hours, such as not greater than about 12 hours or not greater than about 6 hours or not greater than about 3 hours or not greater than 1 hour. It will be appreciated that the duration of drying can be within a range between any of the minimum and maximum values noted above. It will be appreciated that the drying duration can be altered depending upon various factors, including the material, the average particle size of the shaped abrasive particles, and the like.

Additionally, drying may be conducted at a particular relative humidity to facilitate formation of shaped abrasive particles according to the embodiments herein. For example, drying may be conducted at a relative humidity of at least about 10%, such as at least 20%, at least about 30%, at least about 40%, at least about 50%, at least about 60%, such as at least about 62%, at least about 64%, at least about 66%, at least about 68%, at least about 70%, at least about 72%, at least about 74%, at least about 76%, at least about 78%, or even at least about 80%. In still other non-limiting embodiments, drying may be conducted at a relative humidity of not greater than about 90%, such as not greater than about 88%, not greater than about 86%, not greater than about 84%, not greater than about 82%, not greater than about 80%, not greater than about 78%, not greater than about 76%, not greater than about 74%, not greater than about 72%, not greater than about 70%, not greater than about 65%, not greater than about 60%, not greater than about 55%, not greater than about 50%, not greater than about 45%, not greater than about 40%, not greater than about 35%, not greater than about 30%, or even not greater than about 25%. It will be appreciated that the relative humidity utilized during drying can be within a range between any of the minimum and maximum percentages noted above.

As the green particles 172 pass through and exit the dryer 140 they may be formed into precursor shaped abrasive particles 174. The precursor shaped abrasive particles 174 can land on the conveyor belt 156 of the conveyor 150. The precursor shaped abrasive particles 174 may then travel downstream on the conveyor belt 156 for further processing.

In one embodiment, the precursor shaped abrasive particles 174 can exit the conveyor belt 150 into the collection receptacle 160.

After completing the drying process, but before the precursor shaped abrasive particles 174 are collected for further use in an abrasive article, one or more post-forming processes may be completed. Exemplary post-forming processes can include surface shaping, curing, reacting, radiating, planarizing, calcining, sintering, sieving, doping, drying, and a combination thereof. For example, in one optional process, the precursor shaped abrasive particles 174 may be translated by the conveyor 150 through an optional shaping zone, wherein at least one exterior surface of the precursor shaped abrasive particles 174 may be further shaped.

In still another embodiment, the precursor shaped abrasive particles 174 may be translated through an optional application zone, wherein a dopant material can be applied. In particular instances, the process of applying a dopant material can include selective placement of the dopant material on at least one exterior surface of the precursor shaped abrasive particles 174. In an optional process, the precursor shaped abrasive particles 174 may be treated with one or more acid or base materials. Treatment may occur post-calcination and may affect a distribution of dopant material within the shaped abrasive particle. In alternative instances, an impregnation process may be used instead of doping, where impregnation utilizes an additive introduced to the precursor particles after calcination. Utilization of doping or impregnation may affect distribution of the dopant material within the final shaped abrasive particle which may also facilitate increased performance of the shaped abrasive particle.

The dopant material may be applied utilizing various methods including for example, spraying, dipping, depositing, impregnating, transferring, punching, cutting, pressing, crushing, and any combination thereof. In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate. In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The forming process may further include a sintering process. For certain embodiments herein, sintering can be conducted after the precursor shaped abrasive particles 174 are dried in the dryer 140. Sintering of the precursor shaped abrasive particles 174 may be utilized to densify the precursor shaped abrasive particles 174 and create the finally-formed shaped abrasive particles. In a particular instance, the sintering process can facilitate the formation of a high-temperature phase of the ceramic material. For example, in one embodiment, the precursor shaped abrasive particles 174 may be sintered such that a high-temperature phase of alumina, such as alpha alumina, is formed. In one instance, a shaped abrasive particle can comprise at least about 80 wt % alpha alumina, such as at least 90 wt % alpha alumina for the total weight of the particle. In other instances, the content of alpha alumina may be greater such that the shaped abrasive particle may consist essentially of alpha alumina.

The body of each of the precursor shaped abrasive particles 174 can have a particular two-dimensional shape. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include rectangular, trapezoidal, pentagonal, hexagonal, heptagonal, octagonal, nonagonal, decagonal, and any combination thereof. In another instance, the finally-formed shaped abrasive particles 174 can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles 174 can have a particular number of exterior points or external corners. For example, the body of the precursor shaped abrasive particles 174 can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 2:
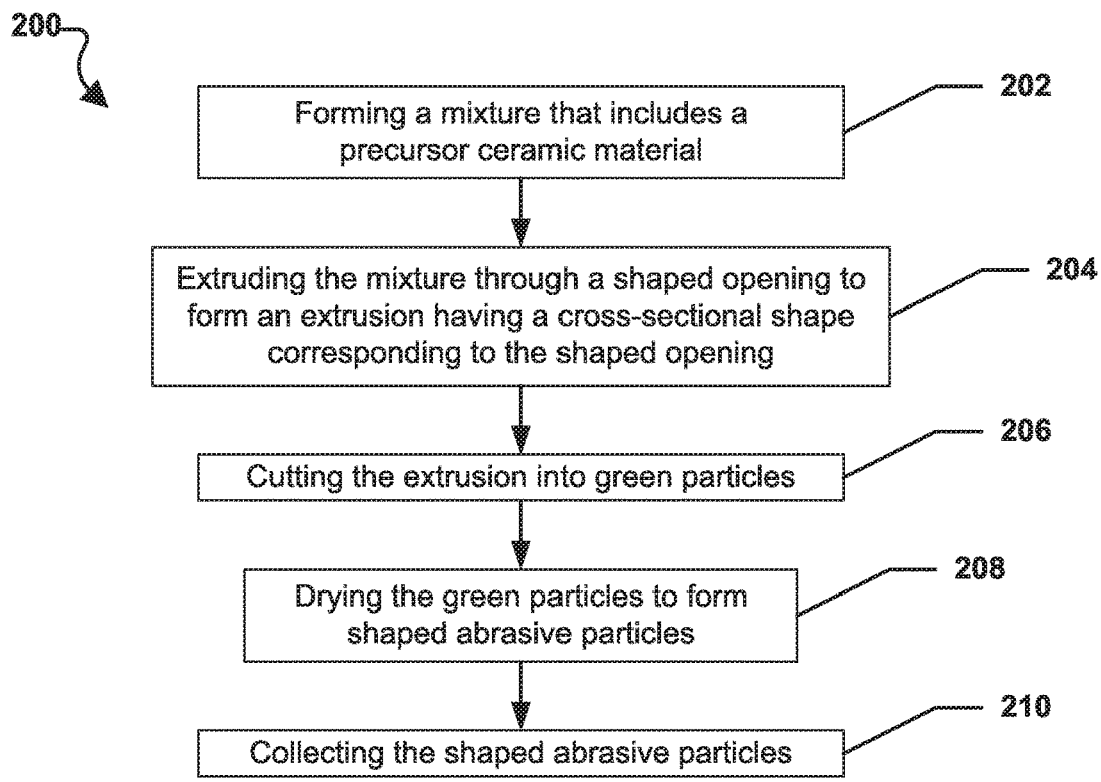
FIG. 2 includes a flow chart of a method of forming a particulate material in accordance with an embodiment.

Referring to FIG. 2, a method of forming shaped abrasive particles in accordance with one, non-limiting embodiment is illustrated and is generally designated 200. Notably, the process illustrated in FIG. 2 includes the process of using the system as described in accordance with FIG. 1. At step 202, the method can include forming a mixture that includes a precursor ceramic material. In a particular aspect, the mixture can be similar to the mixture 108 described above in conjunction with FIG. 1.

Proceeding to step 204, the method 200 can include extruding the mixture through a shaped opening to form an extrusion having a cross-sectional shape corresponding to the shaped opening. In a particular aspect, the mixture may be extruded through an extruder similar to the extruder 102 described above. At step 206, the method 200 can include cutting the extrusion into green particles. The extrusion, or extrudate, may be cut into green particles as it passes through one or more rotating cutters, e.g., as described above in conjunction with FIG. 1. At step 208, method 200 can include drying the green particles to form shaped abrasive particles. The green particles may be dried by dropping them through a vertical air dryer, e.g., through a dryer that is similar to the dryer 140 depicted in FIG. 1. In another aspect, the green particles may be dried using other methods well known in the art. Finally, at step 210, the method 200 can include collecting the shaped abrasive particles.

Figure 3:
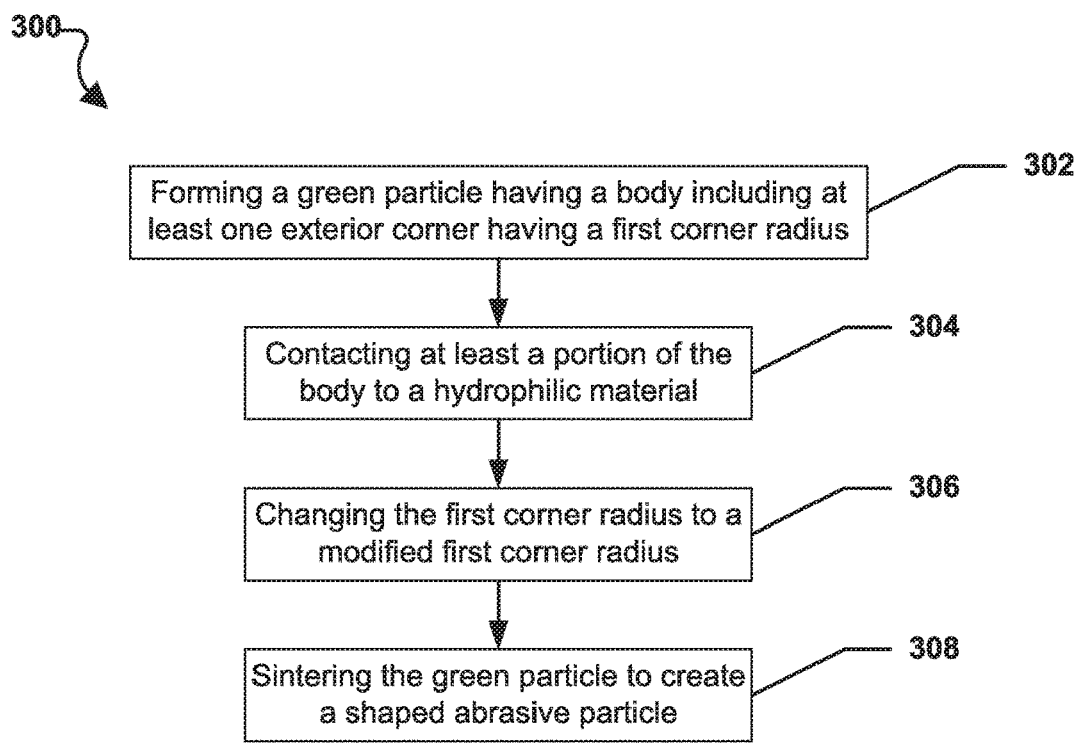
FIG. 3 includes a flow chart of a method of forming a particulate material in accordance with an embodiment.

FIG. 3 illustrates a flowchart of a method, generally designated 300, of forming shaped abrasive particles in accordance with one, non-limiting embodiment. The process described in FIG. 3 is different than the process described in the flow chart of FIG. 2 and may use a different system as compared to the system described in FIG. 1. As depicted, at step 302, the method 300 can include forming a green particle that has a body that includes at least one exterior corner that has a first corner radius. In a particular aspect, the green particle may be formed using an extrusion process, a molding process, a screen printing process, a stamping process, or some other process known in the art. Specifically, the green particle may be formed using a screen printing process.

Further, in a particular aspect, the green particle may be formed from a mixture that is similar to the mixture 108 described above in conjunction with FIG. 1. Moving to step 304, the method 300 can include contacting at least a portion of the body to a modifying tool. The modifying tool may be made of a particular material and have particular surface properties with respect to the mixture, such that the modifying tool is configured to change the shape of the body after forming but before significant drying of the body. For example, in one embodiment the modifying tool can include a hydrophobic material. In yet another embodiment, the modifying tool can include a hydrophilic material. The use of a tool having a particular material (e.g., a hydrophilic material or a hydrophobic material) may facilitate modification of the shape of the body post-forming by encouraging the mixture to react in a particular manner when placed in contact with the material of the tool. For example, in one embodiment, the modification tool is used to modify the shape of the mixture making the body, and in particular, it is envisioned that the modification tool can be used to change the corner sharpness and edge sharpness of the body post-forming.

The modification tool may be a surface with select regions of hydrophobic and/or hydrophilic material such that when the precursor shaped abrasive particles are placed in contact with the modification tool, the mixture making up the bodies of the precursor shaped abrasive particles is encouraged to move in accordance with the regions defined by the hydrophobic and/or hydrophilic material. In one particular aspect, the modification tool is formed to include a pattern of hydrophilic portions made of a hydrophilic material and such hydrophilic portions are surrounded by hydrophobic portions. The precursor abrasive particles are placed on the hydrophilic portions and the mixture of the body is encouraged to flow and correspond to the general shape of the hydrophilic portions and thus the body of the precursor shaped abrasive particle is modified post formation. It is envisioned that such a method may be used to create precursor shaped abrasive particles with sharper edges and corners than is currently available via conventional molding and printing operations. It will be appreciated that the ability of the mixture to move in relation to the modification tool may depend in part upon the rheological properties of the mixture, including for example viscosity. It may be feasible to use a mixture having a low viscosity and/or low storage modulus to allow for some flow of the mixture in response to the modification tool.

The production tool may be a surface, a patterned surface with protrusions and depressions, a mold having cavities as blind holes and/or apertures, a screen, or any combination thereof.

For example, referring again to FIG. 3, at step 306, the method 300 can include changing the first corner radius to a modified first corner radius. In a particular aspect, the modified first corner radius can be less than the first corner radius. Further, the step of contacting a portion of the body to a hydrophobic material can include placing the green particle in contact with a hydrophobic surface and contacting the green particle with the hydrophobic surface can reduce the first corner radius. For example, the modified first corner radius can be less than 50 microns or less than 30 microns or less than 20 microns or less than 10 microns or less than 5 microns or less than 1 micron.

Thereafter, the method 300 can include sintering the green particle to create a shaped abrasive particle at step 308. Sintering may be conducted according to those methods disclosed herein or as known in the art. It will be understood that the process of FIG. 3 is disclosed as being suitable for modification of the shape of precursor shaped abrasive particles post-formation, but such a modification tool can be used in other instances. For example, such a modification tool may be suitable for use on a sheet of mixture, wherein the precursor abrasive particles have not been formed. In certain embodiments, it is contemplated that the modification tool can be both a shaping tool and a modification tool, such that the shaping and modification can occur simultaneously. Such shaping tools may be formed using any suitable technique, including for example, but not limited to a photolithography process for forming exact and discrete regions on a surface.

Figure 4:
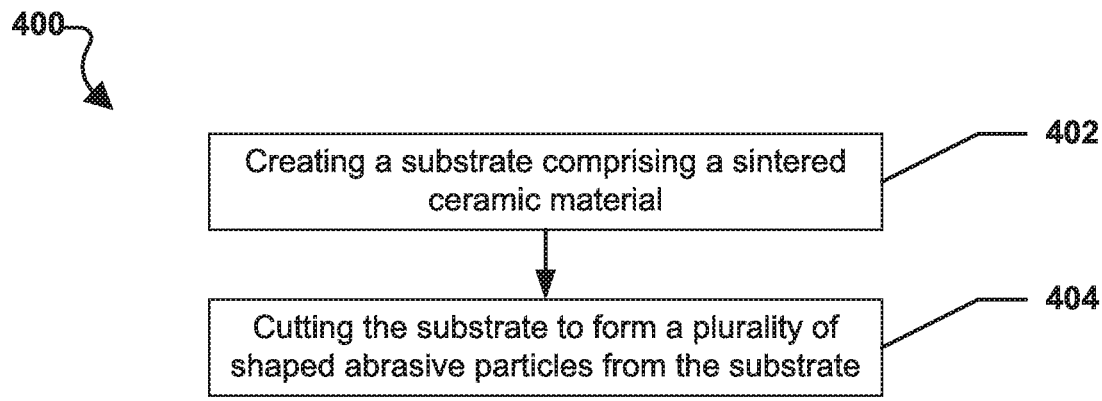
FIG. 4 includes a flow chart of a method of forming a particulate material in accordance with an embodiment.

Referring now to FIG. 4, a method of forming shaped abrasive particles in accordance with one, non-limiting embodiment is illustrated and is generally designated 400. At step 402, the method 400 can include creating a substrate comprising a sintered ceramic material. Then, at step 404, the method 400 can include cutting the substrate to form a plurality of shaped abrasive particles from the substrate In particular embodiment, the step of creating a substrate comprising a sintered ceramic material can include creating a mixture comprising a precursor ceramic material, forming the mixture into a green body, and sintering the green body to form a sintered ceramic material in the form of the substrate. In a particular aspect, the mixture can be similar to the mixture 108 described above in conjunction with FIG. 1. In another aspect, the substrate can be in the form a polyhedral shape. Further, the substrate can be in the form of a cuboid.

In a particular aspect, the step of cutting the substrate can be performed with one or more mechanical devices, such as a blade (e.g., a 1A8 abrasive dicing blade). In another aspect, cutting the substrate can be performed using a bonded abrasive thin wheel that includes superabrasive particles contained in a bond matrix. In still another embodiment, a milling operation may be used to cut one or more shaped abrasive particles from the sintered substrate.

Unlike other conventional processes, the process of cutting the substrate and forming shaped abrasive particles is completed on a sintered substrate material. In one embodiment, the sintered ceramic material can include alumina. In particular, the sintered ceramic material can include alpha alumina. In another aspect, the step of cutting the substrate can be accomplished using a computer controlled cutting operation that is configured to create shaped abrasive particles that have complex three-dimensional shapes. Moreover, each of the shaped abrasive particles of the plurality of shaped abrasive particles can have substantially the same shape with respect to each other. However, in another aspect, at least a portion of the shaped abrasive particles of the plurality of shaped abrasive particles have a different two-dimensional shape with respect each other.

Figure 5:
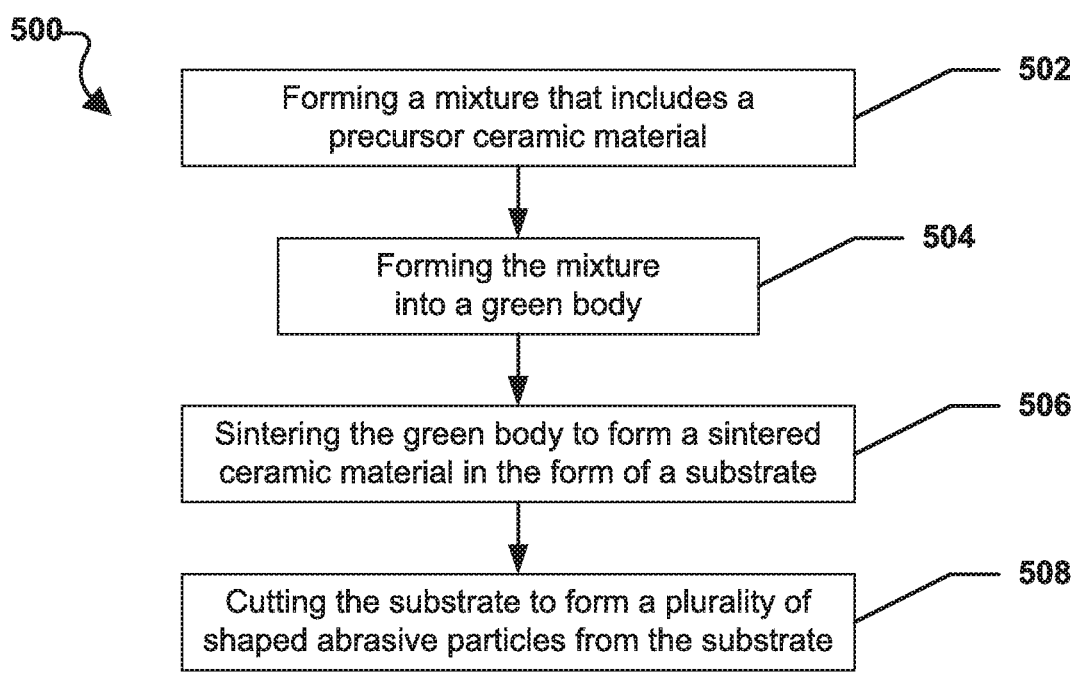
FIG. 5 includes a flow chart of a method of forming a particulate material in accordance with an embodiment.

FIG. 5 depicts a flowchart of a method of forming shaped abrasive particles in accordance with one, non-limiting embodiment. The method is generally designated 500. As illustrated, at step 502, the method 500 can include forming a mixture that includes a precursor ceramic material. In a particular aspect, the mixture can be similar to the mixture 108 described above in conjunction with FIG. 1. At step 504, the method 500 can include forming the mixture into a green body. In a particular aspect, the green body may be formed using an extrusion process, a molding process, a screen printing process, a stamping process, or some other process known in the art.

Moving to step 506, the method 500 can include sintering the green body to form a sintered ceramic material in the form of a substrate. The green body may be sintered as described above or using another sintering process well known in the art. At step 508, the method 500 can include cutting the substrate to form a plurality of shaped abrasive particles from the substrate.

Figure 6:
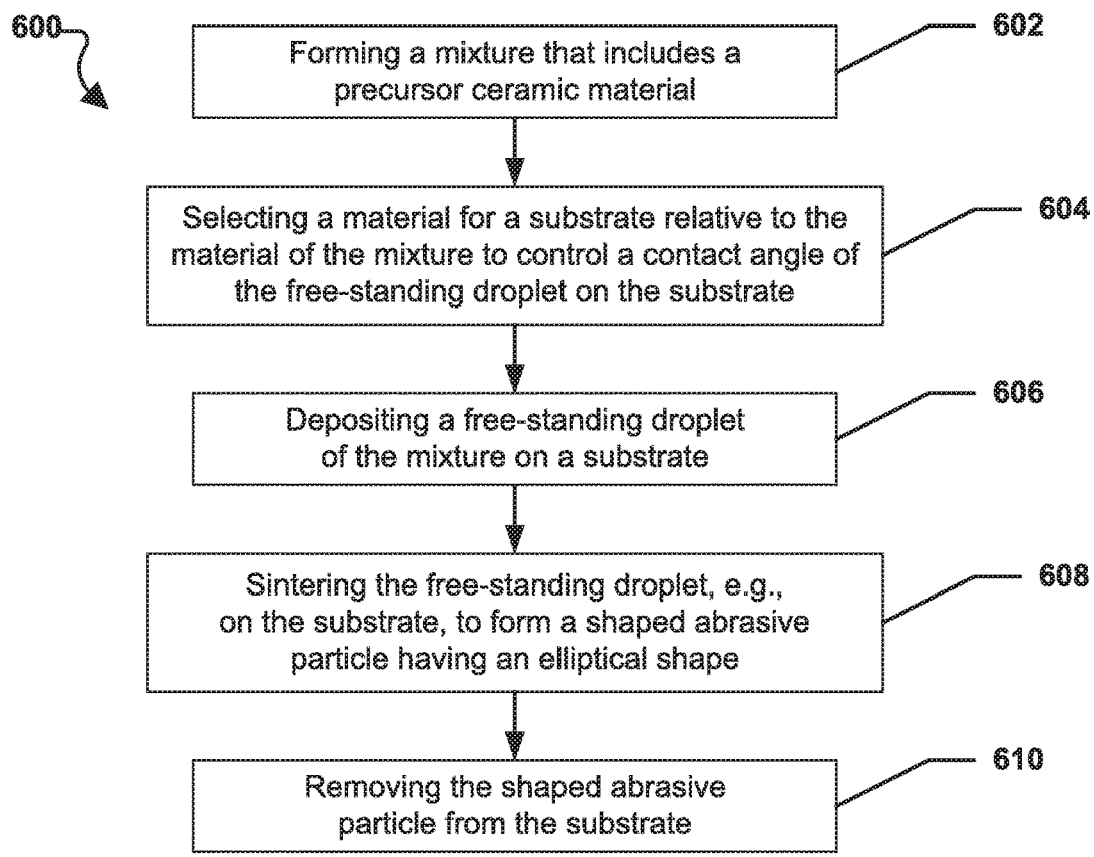
FIG. 6 includes a flow chart of a method of forming a particulate material in accordance with an embodiment.

Referring to FIG. 6, a method of forming shaped abrasive particles in accordance with one, non-limiting embodiment is illustrated and is generally designated 600. At step 602, the method 600 can include forming a mixture that includes a precursor ceramic material. In a particular aspect, the mixture can be similar to the mixture 108 described above in conjunction with FIG. 1. At step 604, the method 600 can include selecting a material for a substrate relative to the material of the mixture to control a contact angle of the mixture on the substrate. Further, at step 606, the method 600 can include depositing a free-standing droplet of the mixture on the substrate. At step 608, the method 600 can include further processing the free-standing droplet to form a shaped abrasive particle that has an upper surface having an elliptical, or curvilinear, shape. Further processing can include any post-formation processes described in any of the embodiments herein, including but not limited to, drying, sintering, and the like. Finally, at step 610, the method 600 can include removing the shaped abrasive particle from the substrate.

In a particular aspect, the step of depositing a free-standing droplet of the mixture on the substrate can include dropping a plurality of drops of the mixture from a deposition assembly. The deposition assembly can have a selectable deposition volume and is configured to control the volume of mixture that is deposited for each free-standing droplet. For example, in at least one embodiment, the process can include using a selective printing process to selectively deposit droplets of a known volume, size and at specified locations on the substrate. Further, the free-standing droplet can include a contact angle with the substrate of less than 50 degrees or less than 40 degrees or less than 30 degrees. In another aspect, the contact angle can be at least 1 degree or at least 2 degrees or at least 5 degrees or at least 8 degrees or at least 10 degrees.

The process described in conjunction with FIG. 6 can be a continuous process and the substrate can be translated under a deposition assembly that continuously deposits a plurality of free-standing droplets onto the substrate as it is translated under the deposition assembly. The method can further include controlling an average particle size of the shaped abrasive particle based on the volume of material deposited in the free-standing droplet. In another aspect, the method can include controlling an average particle size of the shaped abrasive particle based on the material of the substrate and the material of the mixture. Moreover, it is envisioned that the process of FIG. 6 can be combined with the process described in FIG. 3, wherein the droplet may be placed on a modification tool, such that the contact angle and the corner sharpness can be controlled by controlled placement of the mixture onto a modification tool having at least one of hydrophilic portions and/or hydrophobic portions.

Figure 7:
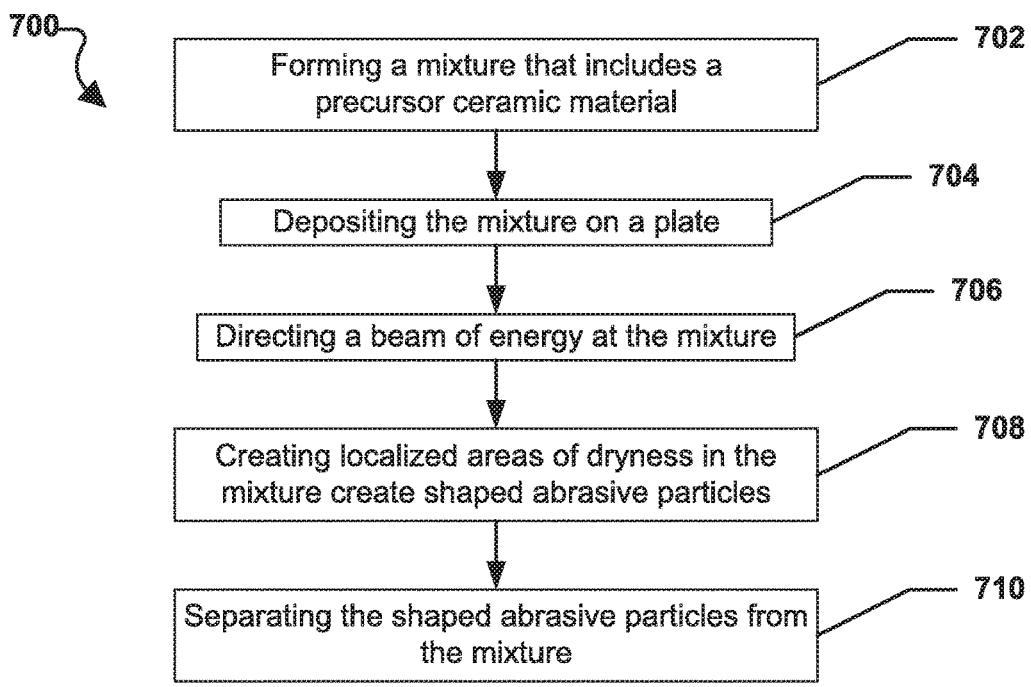
FIG. 7 includes a flow chart of a method of forming a particulate material in accordance with an embodiment.

FIG. 7 includes a flowchart of a method, generally designated 700, of forming shaped abrasive particles in accordance with one, non-limiting embodiment. As depicted in FIG. 7, at step 702, the method 700 can include forming a mixture that includes a precursor ceramic material. In a particular aspect, the mixture can be similar to the mixture 108 described above in conjunction with FIG. 1. At step 704, the method 700 can include depositing the mixture on a plate. Moreover, at step 706, the method 700 can include directing a beam of energy at the mixture. In one aspect, the beam of energy can be in the form a laser beam. At step 708, the method 700 can include creating localized areas of dryness in the mixture create shaped abrasive particles. Then, at step 710, the method 700 can include separating the shaped abrasive particles from the mixture.

Shaped Abrasive Particles

FIG. 8 through FIG. 12 illustrate various aspects of a shaped abrasive particle 800 that can be made using one or more of the methods described herein. For example, in at least one embodiment, the shaped abrasive particle 800 can be made using the method illustrated in FIG. 3.

Figure 8:
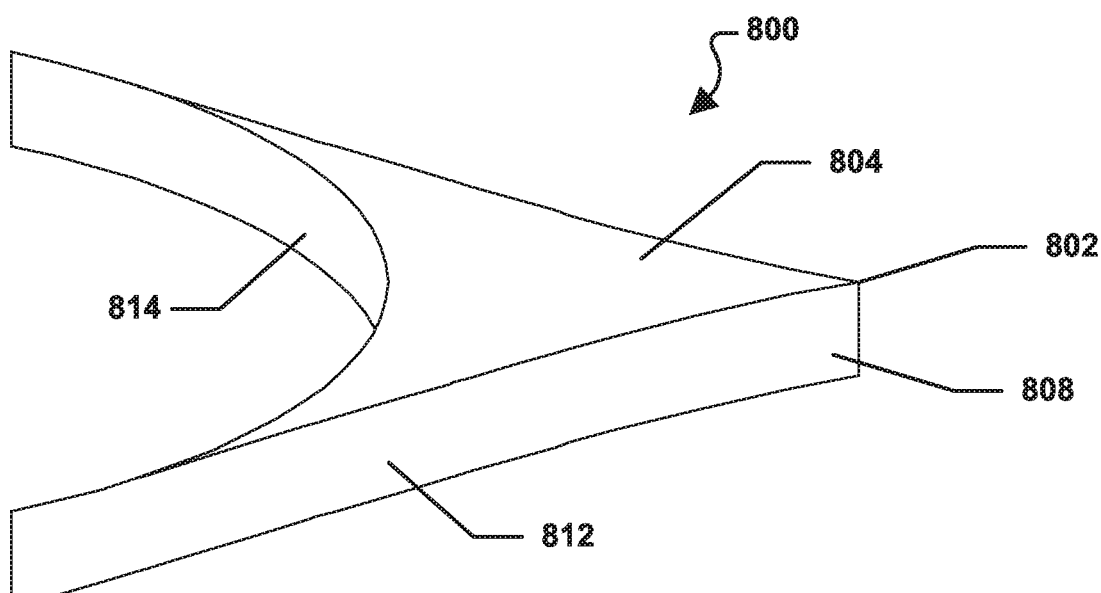
FIG. 8 includes a perspective view of a shaped abrasive particle in accordance with an embodiment.
Figure 9:
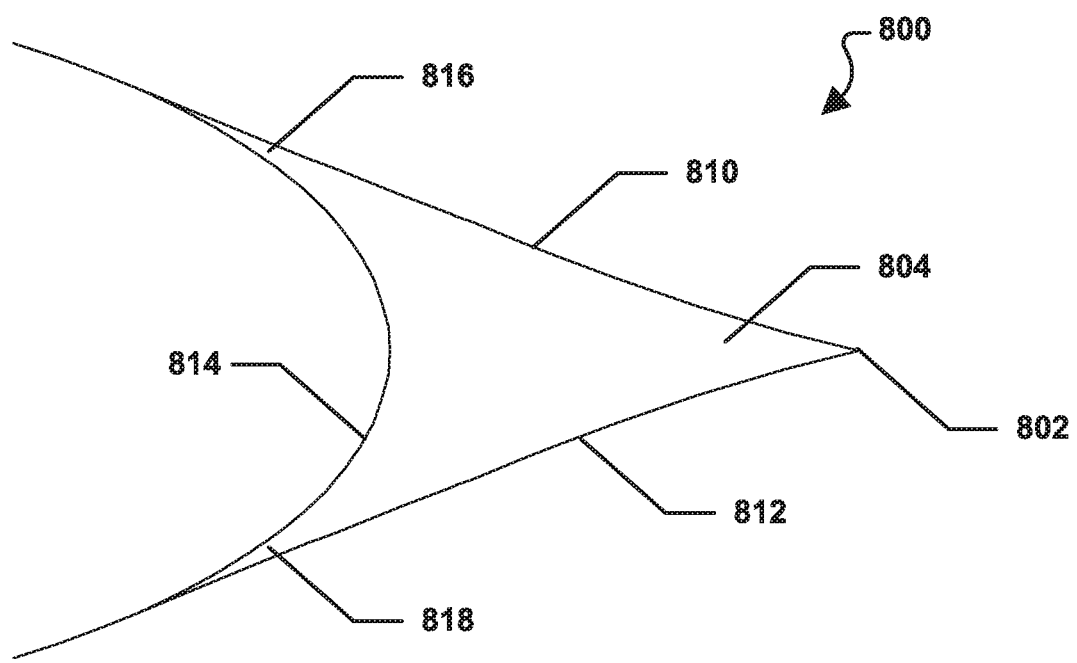
FIG. 9 includes a top plan view of a shaped abrasive particle in accordance with an embodiment.

FIG. 8 includes a perspective view of the shaped abrasive particle 800. FIG. 9 is a top plan view of the shaped abrasive particle 800. The bottom plan view is the same as the top plan view shown in FIG. 9. FIG. 10 is a front plan view of the shaped abrasive particle 800. The rear plan view of the shaped abrasive particle 800 is the same as the front plan view depicted in FIG. 10. FIG. 11 is a first side plan view of the shaped abrasive particle 800 and FIG. 12 is a second side plan view of the shaped abrasive particle 800.

As illustrated, the shaped abrasive particle 800 can include a body 802 that can be generally shaped like an arrowhead. The body 802 can include a first major surface 804 and a second major surface 806. A side surface 808 can extend between the first major surface 804 and the second major surface 806. The side surface 808 can include a first portion 810, a second portion 812, and a third portion 814. The first portion 810 can form an angle 814 with respect to the second portion 812. The angle 814 can be less than or equal to 75°, such as less than or equal to 60°, less than or equal to 50°, less than or equal to 40°, or less than or equal to 35°. In another aspect, the angle 814 can be greater than or equal to 15°, such as greater than or equal to 20°, greater than or equal to 25°, or greater than or equal to 30°.

FIG. 9 shows that the third portion 814 of the side surface 808 can extend between the first portion 810 and the second portion 812 of the side surface 808. The third portion 814 can be generally elliptical in shape. As shown in FIG. 9, the third portion 814 of the side surface 808 can meet the first portion 810 of the side surface 808 to form a first corner 816. The third portion 814 of the side surface 808 can also meet the second portion 812 of the side surface 808 to form a second corner 818.

Figure 13:
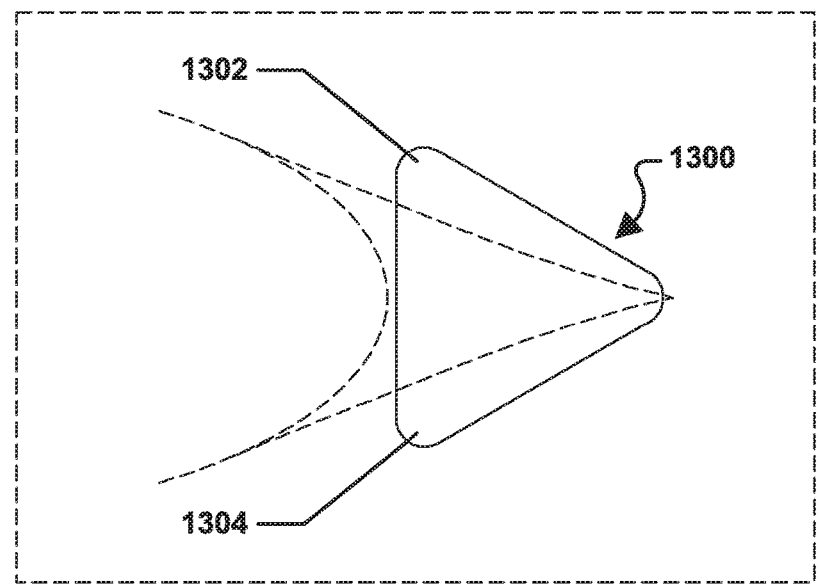
FIG. 13 includes a top plan view of an intermediately formed shaped abrasive particle in accordance with an embodiment.

In a particular aspect, the shaped abrasive particle 800 can be formed using the method described in conjunction with FIG. 3. As such, before the final shaped abrasive particle 800 is formed, a green particle is formed. FIG. 13 illustrates a green particle 1300 that is an intermediate shaped abrasive particle. The green particle 1300 can include a body 1302 having a first corner 1304 and a second corner 1306. The green particle 1300 can be screen printed onto a modifying tool. After the green particle 1300 is screen printed, but before the green particle 1300 is dried, the green particle 1300 can be placed on a modification tool 1320 having an indentation 1322, or opening, that has a two-dimensional shape that corresponds to the shape of the outer periphery of the shaped abrasive particle 800. The surface of the modification tool 1320 can include particular materials having certain properties (e.g., hydrophobic and/or hydrophilic materials) that can cause the green particle 1300 to be re-shaped to a final shape, e.g., the shape of the indentation 1322 in the modification tool 1320. For example, if the modification tool 1320 is hydrophilic and the green particle 1300 contains water, the green particle 1300 can be pulled into the shape of the indentation 1322. As such, the shape of the green particle 1300 can be modified from the generally triangular shape depicted in FIG. 13 to the arrow shape of the shaped abrasive particle 800 illustrated in FIG. 9.

As such, the final shape can be the shape of the shaped abrasive particle 800 as depicted in FIG. 9. Notably, such a process may be used to create the illustrated shaped abrasive particle having side walls with a depression (e.g., concave shape) and sharp, narrow corners. Specifically in one embodiment, the green particles are rounded particles that are then created into the shape abrasive particles illustrated in FIG. 9. It will be appreciated that certain corners may further be more pointed, such that they may experience some reduction in height at the corners or appear as tapered along the upper surface.

During the process, after contact with the hydrophobic surface a first corner radius of the first corner 1304 of the green particle 1300 can become a modified first corner radius of the first corner 816 of the shaped abrasive particle 800. Further, a second corner radius of the second corner 1306 of the green particle 1300 can be become a modified second corner radius of the second corner 818 of the shaped abrasive particle 800. In a particular aspect, the modified first corner radius is less than the first corner radius and the modified second corner radius is less than the second corner radius. Further, first corner radius 1302 and the second corner 1304 radius of the green particle 1300 can be reduced by placing the green particle 1300 in contact with a hydrophobic and/or hydrophilic surface of the modification tool 1320.

Specifically, the contact of the green particle 1300 with the surface of the modifying tool having the particular materials can facilitate reduction of the first corner radius of the green particle 1300 to the modified first corner radius of the shaped abrasive particle 800. Further, the contact of the green particle 1300 with the hydrophobic surface can reduce the second corner radius of the green particle 1300 to the modified second corner radius of the shaped abrasive particle 800. For example, the modified first corner radius of the shaped abrasive particle 800 can be less than 50 microns or less than 30 microns or less than 20 microns or less than 10 microns or less than 5 microns or less than 1 micron. Also, the modified second corner radius of the shaped abrasive particle 800 can be less than 50 microns or less than 30 microns or less than 20 microns or less than 10 microns or less than 5 microns or less than 1 micron.

The radius of curvature can be measured from a polished cross-section of the first or second face using image analysis such as a Clemex Image Analysis program interfaced with an inverted light microscope or other suitable image analysis software. The radius of curvature for each triangular apex can be estimated by defining three points at each apex when viewed in cross section at 100× magnification. A point is placed at the start of the tip's curve where there is a transition from the straight edge to the start of a curve, at the apex of the tip, and at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius.

In a particular aspect, after the green particle 1300 is modified, as described herein, the result is a shaped abrasive particle 800 that includes at least one exterior corner, e.g., the first corner 816 or the second corner 818, and the at least one exterior corner can include a corner radius within a range of at least 0.5 microns and not greater than 15 microns. As further indicated in FIG. 8, the body 802 of the shaped abrasive particle 800 can have a thickness 820. The thickness 820 of the body 802 can be substantially the same along a length of the body 802.

FIG. 14 through FIG. 17 depict various aspects of a shaped abrasive particle 1400 that can be made using one or more of the methods described herein. In a particular aspect, the shaped abrasive particle 1400 can be made using the method illustrated in FIG. 6.

Figure 14:
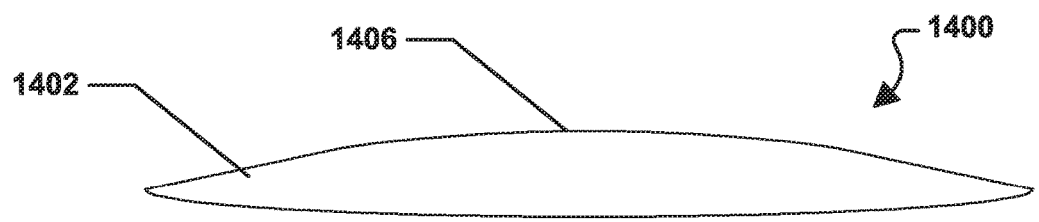
FIG. 14 includes a perspective view of a shaped abrasive particle in accordance with an embodiment.
Figure 15:
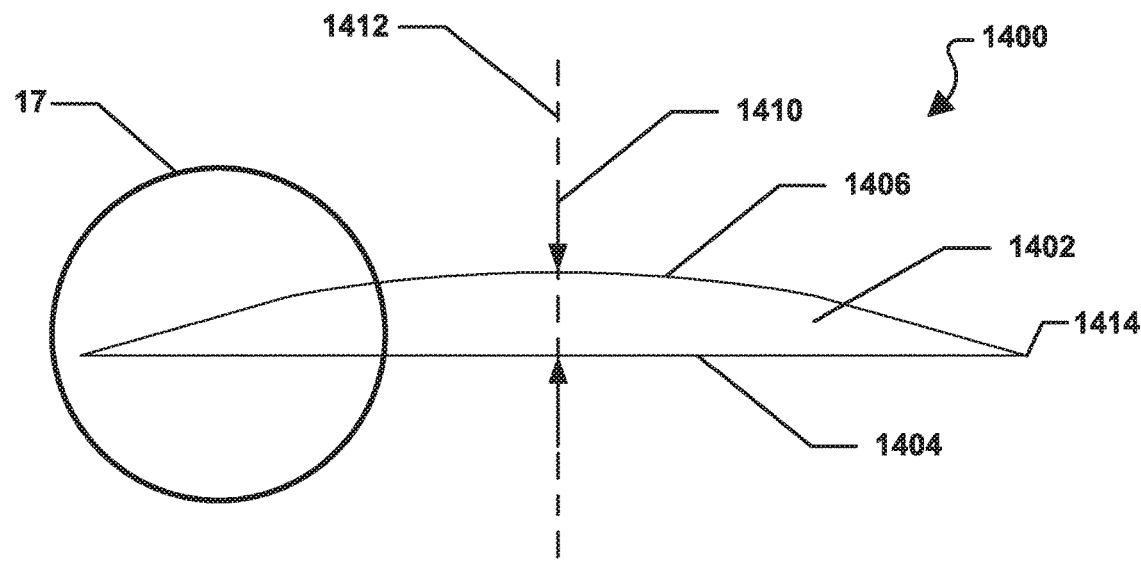
FIG. 15 includes a front plan view of a shaped abrasive particle in accordance with an embodiment.
Figure 16:
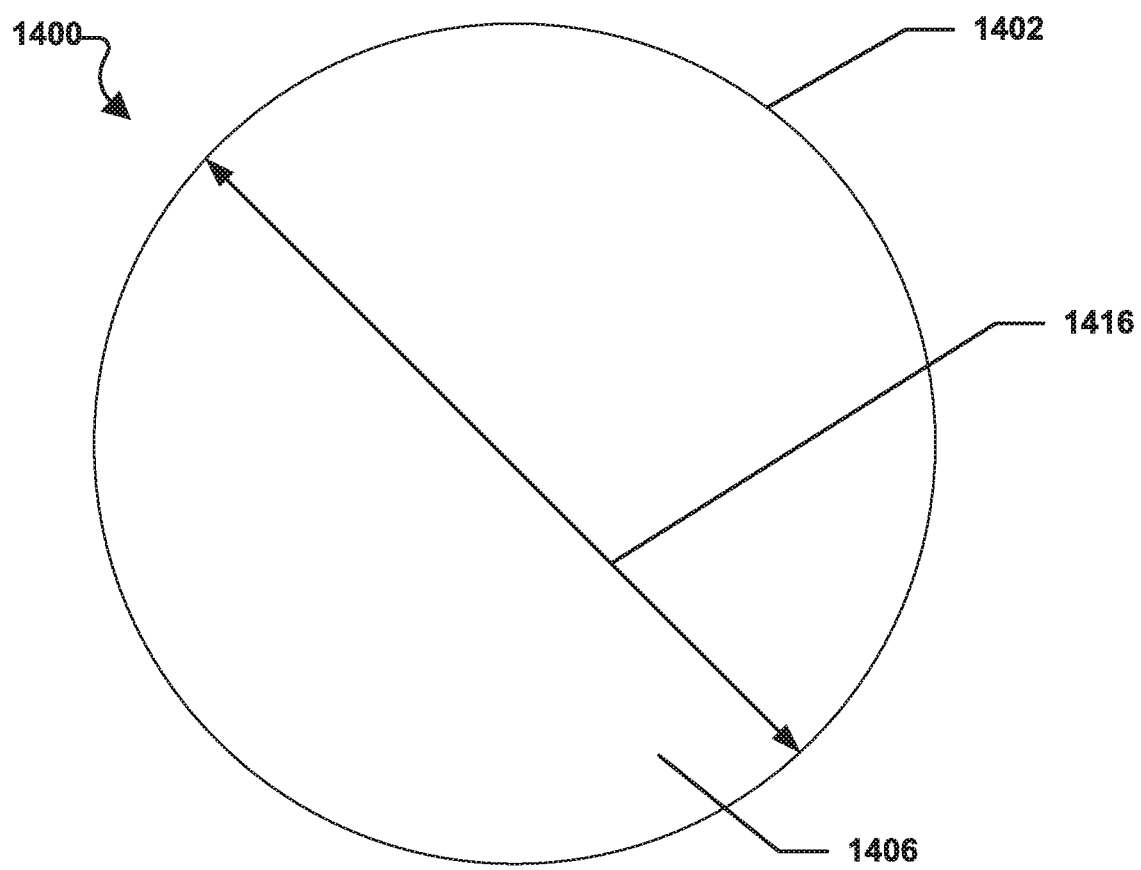
FIG. 16 includes a top plan view of a shaped abrasive particle in accordance with an embodiment.
Figure 17:
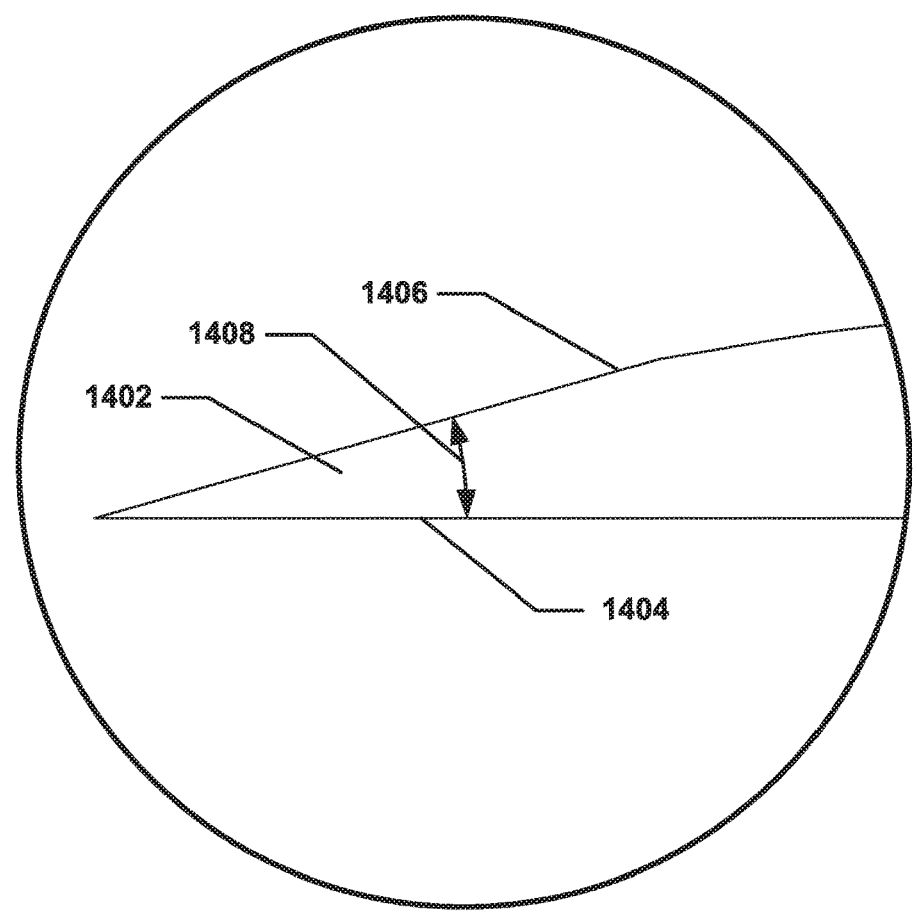
FIG. 17 includes a detailed view of a shaped abrasive particle in accordance with an embodiment take at Circle 17 in FIG. 15.

FIG. 14 includes a perspective view of the shaped abrasive particle 1400. FIG. 15 is a front plan view of the shaped abrasive particle 1400. The rear plan and both side plan views of the shaped abrasive particle 1400 are the same as the front plan view depicted in FIG. 15. FIG. 16 is a top plan view of the shaped abrasive particle 1400. The bottom plan view is the same as the top plan view shown in FIG. 16. FIG. 17 is a detailed view of the shaped abrasive particle 1400 taken at circle 17 in FIG. 15.

As illustrated, the shaped abrasive particle 1400 can include a body 1402. The body 1402 can have the shape of a flattened hemisphere. Specifically, the body 1402 can include a generally flat lower surface 1404 and a generally arcuate upper surface 1406. As depicted in FIG. 17, the arcuate upper surface 1406 can form an angle 1408 with respect to the flat lower surface 1404. In a particular aspect, the angle 1408 can be less than 50 degrees. Further, the angle 1408 can be less than 45 degrees, such as less than 40 degrees, less than 35 degrees, or less than 30 degrees. In another aspect, the angle 1408 can be at least 1 degree, such as at least 2 degrees, at least 3 degrees, at least 4 degrees, at least 5 degrees, at least 8 degrees, or at least 10 degrees.

As indicated in FIG. 15, the body 1402 of the shaped abrasive particle 1400 can have a thickness 1410. The thickness 1410 of the body 1402 is greatest along a central axis 1412 and can decrease from the central axis 1412 outwardly toward an outer peripheral edge 1414 of the body 1402 of the shaped abrasive particle 1400. In a particular aspect, the thickness 1410 at the center of the body 1402 can be greater than or equal to 1 micron. In another aspect, the thickness 1410 at the center of the body 1402 can be greater than or equal to 15 microns, such as greater than or equal to 20 microns, or greater than or equal to 25 microns. In another aspect, the thickness 1410 at the center of the body 1402 can be less than or equal to 5 mm, such as not greater than 3 mm or not greater than 1 mm or not greater than 800 microns or not greater than 600 microns or not greater than 400 microns or not greater than 200 microns or not greater than 100 microns or not greater than 80 microns or not greater than 50 microns or not greater than 20 microns. The thickness can be an average thickness measured from a side view of the abrasive particle. The thickness can be within a range including any of the minimum and maximum values noted above.

As shown in FIG. 16, the body 1402 of the shaped abrasive particle 1400 can have a diameter 1416. In a particular aspect, the diameter 1416 of the body 1402 can be at least 1 micron. In another aspect, the diameter 1416 of the body 1402 can be at least 100 microns, such as at least 500 microns, or at least 1 mm. In another aspect, the diameter 1416 of the body 1402 can be not greater than 5 mm, such as not greater than 4 mm, not greater than 3 mm, or not greater than 2 mm. The diameter can be within a range including any of the minimum and maximum values noted above.

Further, a ratio, $R_{TD}$, of the maximum thickness 1410 of the body 1402 to the diameter 1416 of the body 1402 can be not greater than 1.0. In particular, $R_{TD}$ may be not greater than 0.5, such as not greater than 0.2, not greater than 0.1, or not greater than 0.05. In another aspect, $R_{TD}$ may be at least 0.00002. Moreover, $R_{TD}$ may be at least 0.0001, such as at least 0.005, at least 0.001, or at least 0.05. $R_{TD}$ can be within a range including any of the minimum and maximum values noted above.

Figure 18:
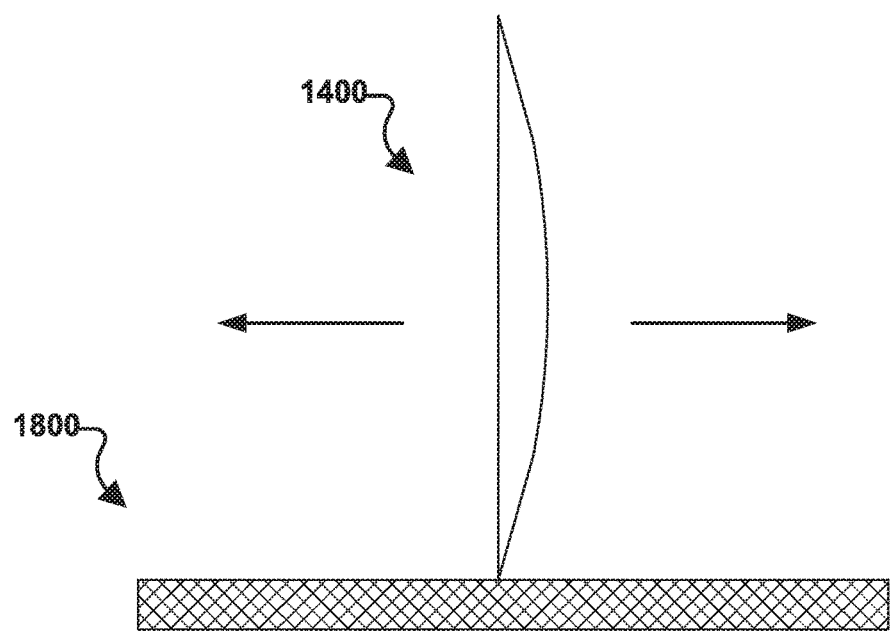
FIG. 18 includes a plan view of a shaped abrasive particle in contact with a workpiece in accordance with an embodiment.

FIG. 18 illustrates a shaped abrasive particle, e.g., the shaped abrasive particle 1400 depicted in FIG. 14 through FIG. 17, in contact with a workpiece 1800. As shown, using the shaped abrasive particle 1400 to grind, or abrade, the workpiece 1800 in a direction orthogonal to the length of the shaped abrasive particle 1400, as indicated by arrow 1802 and arrow 1804 can lead to a wide cutting edge and a low wear flat area.

The shaped abrasive particles described herein can be formed such that each respective body can include a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

In an alternative and non-limiting embodiment, the body of each shaped abrasive particle can be an agglomerate including a plurality of abrasive particles, grit, and/or grains bonded to each other to form the body of the abrasive particle. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, each shaped abrasive particle can be formed such that the abrasive grains forming the body thereof can include alumina, and more particularly, may consist essentially of alumina. Moreover, in particular instances, the shaped abrasive particle can be formed from a seeded sol-gel.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron, not greater than about 0.9 microns, not greater than about 0.8 microns, not greater than about 0.7 microns, or even not greater than about 0.6 microns. Still, the average grain size of the abrasive grains contained within each body can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

In accordance with certain embodiments, one or more of the abrasive particles described herein can be a composite article including at least two different types of grains within the respective body. It will be appreciated that different types of grains are grains having different compositions with regard to each other. For example, the body can be formed such that is includes at least two different types of grains, wherein the two different types of grains can be nitrides, oxides, carbides, borides, oxynitrides, oxyborides, diamond, and a combination thereof.

In accordance with an embodiment, the shaped abrasive particles described herein can have an average particle size, as measured by the largest dimension measurable on the body thereof, of at least about 100 microns. In fact, the shaped abrasive particles can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the shaped abrasive particles can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

The shaped abrasive particles of the embodiments herein, e.g., the bodies thereof, can have particular compositions. For example, the bodies may include a ceramic material, such as a polycrystalline ceramic material, and more particularly an oxide. The oxide may include, for example alumina. In certain instances, the bodies may include a majority content of alumina, such as at least about 80 wt % alumina for the total weight of the body, or such as at least about 90 wt %, at least about 95 wt %, at least about 95.1 wt %, at least about 95.2 wt %, at least about 95.3 wt %, at least about 95.4 wt %, at least about 95.5 wt %, at least about 95.6 wt %, at least about 95.7 wt %, at least about 95.8 wt %, at least about 95.9 wt %, at least about 96 wt %, at least about 96.1 wt %, at least about 96.2 wt %, at least about 96.3 wt %, at least about 96.4 wt %, at least about 96.5 wt %, at least about 96.6 wt %, at least about 96.7 wt %, at least about 96.8 wt %, at least about 96.9 wt %, at least about 97 wt %, at least about 97.1 wt %, at least about 97.2 wt %, at least about 975.3 wt %, at least about 97.4 wt %, or even at least about 97.5 wt % alumina for the total weight of the body. Still, in another non-limiting embodiment, the bodies may include a content of alumina not greater than about 99.5 wt %, such as not greater than about 99.4 wt %, not greater than about 99.3 wt %, not greater than about 99.2 wt %, not greater than about 99.1 wt %, not greater than about 99 wt %, not greater than about 98.9 wt %, not greater than about 98.8 wt %, not greater than about 98.7 wt %, not greater than about 98.6 wt %, not greater than about 98.5 wt %, not greater than about 98.4 wt %, not greater than about 98.3 wt %, not greater than about 98.2 wt %, not greater than about 98.1 wt %, not greater than about 98 wt %, not greater than about 97.9 wt %, not greater than about 97.8 wt %, not greater than about 97.7 wt %, not greater than about 97.6 wt %, or even not greater than about 97.5 wt % alumina for the total weight of the body 1201. It will be appreciated that the bodies may include a content of alumina within a range between any of the minimum and maximum values noted above.

The bodies of the shaped abrasive particles maybe formed to include certain additives. The additives can be non-organic species, including but not limited to an oxide. In one particular instance, the additive may be a dopant material, which may be present in a particular minor amount sufficient to affect the microstructure of the material, but present in a greater content than a trace amount or less. The dopant material may include an element selected from the group of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof. In still a more particular embodiment, the dopant material may include magnesium, and may be a magnesium-containing species, including but not limited to, magnesium oxide (MgO).

According to one embodiment, the magnesium-containing species can be a compound including magnesium and at least one other element. In at least one embodiment, the magnesium-containing compound can include an oxide compound, such that the magnesium-containing species includes magnesium and oxygen. In yet another embodiment, the magnesium-containing species can include aluminum, and more particularly may be a magnesium aluminate species. For example, in certain instances, the magnesium-containing species can be a spinel material. The spinel material may be stoichiometric or non-stoichiometric spinel.

The magnesium-containing species may be a distinct phase of material formed in the body as compared to another primary phase, including for example, an alumina phase. The magnesium-containing species may be preferentially disposed at the grain boundaries of the primary phase (e.g., alumina grains). In still other instances, the magnesium-containing species may be primarily and uniformly dispersed throughout the volume of the grains of the primary phase.

The magnesium-containing species may be a strength-altering material. For example, in at least one embodiment, the addition of the magnesium-containing species can be configured to reduce the strength of the body compared to a body that does not include the magnesium-containing species.

Certain compositions of the shaped abrasive particles of the embodiments can include a particular content of magnesium oxide. For example, the bodies of any of the shaped abrasive particles may include a content of a magnesium-containing species of at least about 0.5 wt %, such as at least about 0.6 wt %, at least about 0.7 wt %, at least about 0.8 wt %, at least about 0.9 wt %, at least about 1 wt %, at least about 1.1 wt %, at least about 1.2 wt %, at least about 1.3 wt %, at least about 1.4 wt %, at least about 1.5 wt %, at least about 1.6 wt %, at least about 1.7 wt %, at least about 1.8 wt %, at least about 1.9 wt %, at least about 2 wt %, at least about 2.1 wt %, at least about 2.2 wt %, at least about 2.3 wt %, at least about 2.4 wt %, or even at least about 2.5 wt % for the total weight of the body 1201. In still another non-limiting embodiment, the body 1201 may include a content of a magnesium-containing species of not greater than about 5 wt %, such as not greater than about 4.9 wt %, not greater than about 4.8 wt %, not greater than about 4.7 wt %, not greater than about 4.6 wt %, not greater than about 4.5 wt %, not greater than about 4.4 wt %, not greater than about 4.3 wt %, not greater than about 4.2 wt %, not greater than about 4.1 wt %, not greater than about 4 wt %, not greater than about 3.9 wt %, not greater than about 3.8 wt %, not greater than about 3.7 wt %, not greater than about 3.6 wt %, not greater than about 3.5 wt %, not greater than about 3.4 wt %, not greater than about 3.3 wt %, not greater than about 3.2 wt %, not greater than about 3.1 wt %, not greater than about 3 wt %, not greater than about 2.9 wt %, not greater than about 2.8 wt %, not greater than about 2.7 wt %, not greater than about 2.6 wt %, or even not greater than about 2.5 wt %. It will be appreciated that the content of a magnesium-containing species within the bodies may be within a range between any of the minimum and maximum values noted above. Furthermore, in at least one embodiment, the bodies of the shaped abrasive particles may consist essentially of alumina ($Al_2O_3$) and the magnesium-containing species.

Moreover, the bodies of the shaped abrasive particle of any of the embodiments herein may be formed of a polycrystalline material including grains, which may be made of materials such as nitrides, oxides, carbides, borides, oxynitrides, diamond, and a combination thereof. Further, the bodies can be essentially free of an organic material, essentially free of rare earth elements, and essentially free of iron. The bodies may be essentially free of nitrides, essentially free of chlorides, essentially free of nitrides, or essentially free of oxynitrides. Being essentially free is understood to mean that the body is formed in a manner to exclude such materials, but the body may not necessarily be completely free of such materials as they may be present in trace amounts or less.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A method for forming an abrasive particle comprising:
forming a green particle having a body including at least one exterior corner having a first corner radius; and
contacting at least a portion of the body to a hydrophobic material and changing the first corner radius to a modified first corner radius.

Embodiment 2. The method of embodiment 1, wherein the modified first corner radius is less than the first corner radius.

Embodiment 3. The method of embodiment 1, wherein contacting includes placing the green particle in contact with a hydrophobic surface to reduce the first corner radius.

Embodiment 4. The method of embodiment 1, wherein the modified first corner radius is less than 50 microns or less than 30 microns or less than 20 microns or less than 10 microns or less than 5 microns or less than 1 micron.

Embodiment 5. A shaped abrasive particle having a body including a first surface, a second surface, and a third surface extending between the first surface and the second surface, and wherein the body comprises an exterior corner having a corner radius within a range of at least 0.5 microns and not greater than 15 microns.

Embodiment 6. A method for forming shaped abrasive particles comprising:
creating a substrate comprising a sintered ceramic material; and
cutting the substrate to form a plurality of shaped abrasive particles from the substrate.

Embodiment 7. The method of embodiment 6, wherein creating the substrate comprises:
creating a mixture comprising a precursor ceramic material;
forming the mixture into a green body;
sintering the green body to form a sintered ceramic material in the form of a substrate.

Embodiment 8. The method of embodiment 6, wherein the substrate is in the form a polyhedral shape.

Embodiment 9. The method of embodiment 6, wherein the substrate is in the form of a cuboid.

Embodiment 10. The method of embodiment 6, wherein cutting is performed with a 1A8 type dicing blade.

Embodiment 11. The method of embodiment 6, wherein cutting is performed using a bonded abrasive thin wheel comprising superabrasive particles contained in a bond matrix.

Embodiment 12. The method of embodiment 6, wherein the sintered ceramic material comprises alumina.

Embodiment 13. The method of embodiment 6, wherein the sintered ceramic material comprises alpha alumina.

Embodiment 14. The method of embodiment 6, wherein cutting is a computer controlled cutting operation configured to create shaped abrasive particles having complex three-dimensional shapes.

Embodiment 15. The method of embodiment 6, wherein each of the shaped abrasive particles of the plurality of shaped abrasive particles have substantially the same shape with respect to each other.

Embodiment 16. The method of embodiment 6, wherein at least a portion of the shaped abrasive particles of the plurality of shaped abrasive particles have a different two-dimensional shape with respect each other.

Embodiment 17. A method of forming abrasive particles comprising:
depositing a free-standing droplet on a substrate; the droplet comprising a mixture including a precursor ceramic material; and
sintering the free-standing droplet to form a shaped abrasive particle having an elliptical shape.

Embodiment 18. The method of embodiment 17, wherein depositing includes dropping a plurality of drops from a deposition assembly.

Embodiment 19. The method of embodiment 18, wherein the deposition assembly has a selectable deposition volume and is configured to control the volume of mixture that is deposited for each free-standing droplet.

Embodiment 20. The method of embodiment 17, wherein the free-standing droplet comprises a contact angle with the substrate of less than 50 degrees or less than 40 degrees or less than 30 degrees.

Embodiment 21. The method of embodiment 20, wherein the contact angle is at least 1 degree or at least 2 degrees or at least 5 degrees or at least 8 degrees or at least 10 degrees.

Embodiment 22. The method of embodiment 17, further comprising:

selecting a material of the substrate relative to the material of the mixture to control a contact angle of the free-standing droplet on the substrate.

Embodiment 23. The method of embodiment 17, wherein the process is a continuous process and the substrate is translated under a deposition assembly that continuously deposits a plurality of free-standing droplets onto the substrate as it is translated under the deposition assembly.

Embodiment 24. The method of embodiment 17, further comprising controlling an average particle size of the shaped abrasive particle based on the volume of material deposited in the free-standing droplet.

Embodiment 25. The method of embodiment 17, further comprising controlling an average particle size of the shaped abrasive particle based on the material of the substrate and the material of the mixture.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A shaped abrasive particle having a body including a generally flat lower surface and a generally arcuate upper surface wherein the arcuate supper surface is convex, wherein the arcuate upper surface forms an angle with the flat lower surface wherein the angle is less than 50 degrees and wherein the arcuate upper surface joins the flat lower surface at a peripheral edge.

2. The shaped abrasive particle of claim 1, wherein the body comprises at least about 95 wt % alumina for a total weight of the particle.

3. The shaped abrasive particle of claim 1, wherein the body consists essentially of alumina.

4. The shaped abrasive particle of claim 1, wherein the body comprises a polycrystalline material.

5. The shaped abrasive particle of claim 1, wherein the body is essentially free of a binder.

6. The shaped abrasive particle of claim 1, wherein the body comprises a dopant material selected from the group of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

7. The abrasive particle of claim 1, wherein the abrasive particle is incorporated into a fixed abrasive article.

8. The abrasive particle of claim 7, wherein the fixed abrasive article includes a coated abrasive, bonded abrasive, non-woven abrasive or a combination thereof.

9. The shaped abrasive particle of claim 1, wherein the angle is at least 1 degree and not greater than 40 degrees.

10. The shaped abrasive particle of claim 1, wherein the angle is at least 1 degree and not greater than 30 degrees.

11. The shaped abrasive particle of claim 1, wherein the body comprises a thickness greatest along a central axis.

12. The shaped abrasive particle of claim 11, wherein the thickness at the center of the body is at least 1 micron and not greater than 5 mm.

13. The shaped abrasive particle of claim 1, wherein the body comprises a diameter of at least 1 micron and not greater than 5 mm.

14. The shaped abrasive particle of claim 1, wherein the body comprises a ratio, $R_{TD}$, of not greater than 1.0, wherein the ratio is the maximum thickness of the body to the diameter of the body.

15. The shaped abrasive particle of claim 1, wherein the shaped abrasive particle is configured to grind a workpiece in a direction orthogonal to the length of the shaped abrasive particle.

16. The shaped abrasive particle of claim 1, wherein the body comprises a shape of a flattened hemisphere.

17. A method of grinding a workpiece in a direction orthogonal to the length of the shaped abrasive particle of claim 1.

* * * * *

UNITED STATES PATENT AND TRADEMARK OFFICE
CERTIFICATE OF CORRECTION

| | |
|---|---|
| PATENT NO. | : 10,759,024 B2 |
| APPLICATION NO. | : 15/420673 |
| DATED | : September 1, 2020 |
| INVENTOR(S) | : Alexandra Marazano et al. |

It is certified that error appears in the above-identified patent and that said Letters Patent is hereby corrected as shown below:

In the Claims

Column 23, Line 49, please delete "arcuate supper surface", and insert --arcuate upper surface--

Signed and Sealed this
Sixth Day of September, 2022

*Katherine Kelly Vidal*
*Director of the United States Patent and Trademark Office*